United States Patent [19]

Brown

[11] 4,006,508
[45] Feb. 8, 1977

[54] MANUAL RADIATOR RODDER

[76] Inventor: Leonard Rudolph Brown, 8509 Whiteus Drive, El Paso, Tex. 79925

[22] Filed: Apr. 18, 1975

[21] Appl. No.: 569,403

[52] U.S. Cl. .................... 15/104.05; 15/104.3 SN
[51] Int. Cl.² ........................................ B08B 9/00
[58] Field of Search .... 15/104.03, 104.05, 104.1 R, 15/104.16, 104.2, 104.3 SN; 4/255, 256; 165/95

[56] References Cited

UNITED STATES PATENTS

| | | | |
|---|---|---|---|
| 1,761,592 | 6/1930 | Seidel | 15/104.35 N |
| 1,824,924 | 9/1931 | Paul et al. | 15/104.3 SN |
| 2,042,407 | 5/1936 | Kugelman | 15/104.3 SN |
| 2,639,453 | 5/1953 | Rouse | 15/104.05 |

*Primary Examiner*—Edward L. Roberts
*Attorney, Agent, or Firm*—James J. Brown

[57] ABSTRACT

A radiator core cleaning device for manually removing rust, corrosion, mineral deposits and other compounds or elements from the cores of heat exchangers such as motor cooling radiators used in automobiles, trucks, buses, other like vehicles and other various type motors employing radiator cooling devices that comprise cores of tubular passageways. The cleaning device comprises a rigid, elongated, L-shaped tubular shaft pierced throughout its length and through its diametric center by a semi-flexible shaft that through a manually applied reciprocating motion moves out of and into said aforementioned rigid, elongated, L-shaped tubular shaft into and out of the tubules of a radiator core upon which the device is being used to physically remove build-ups of rust, corrosion, mineral deposits and other compounds or elements from said core.

5 Claims, 5 Drawing Figures

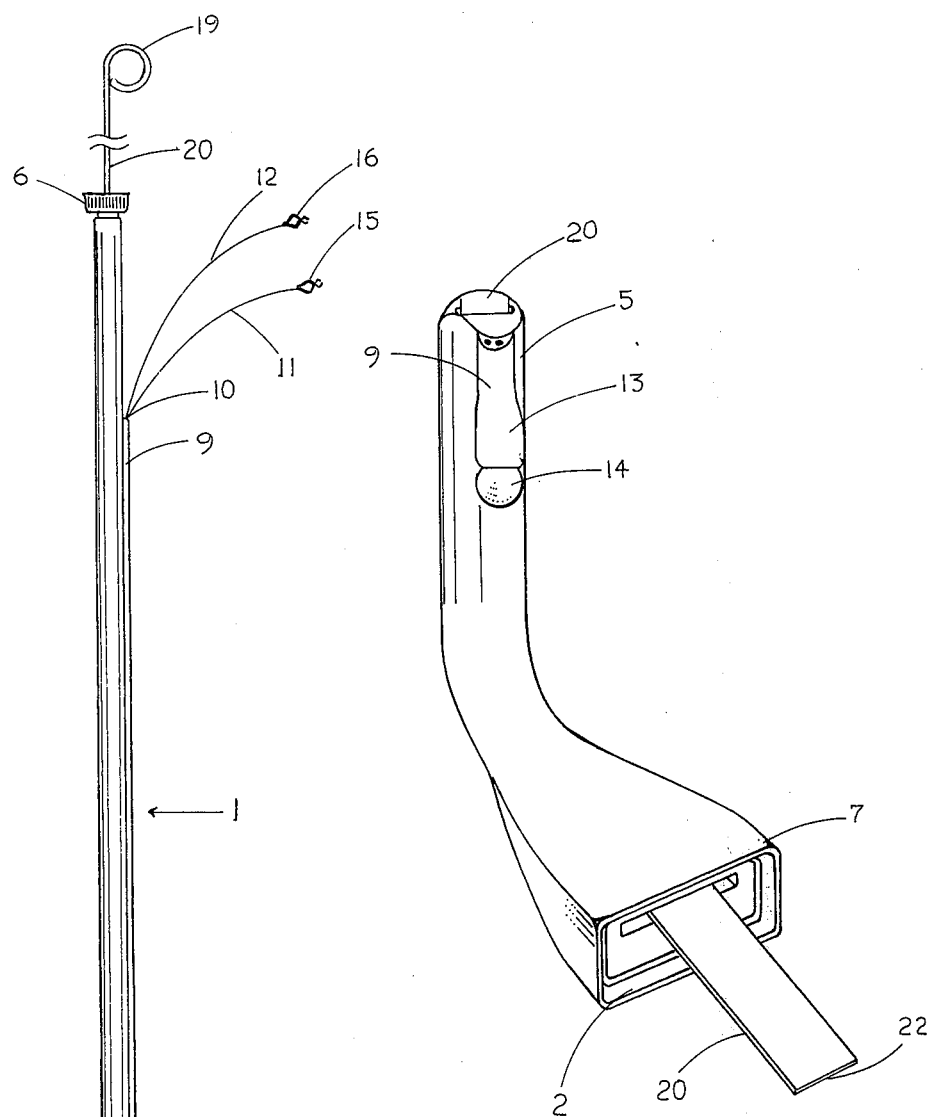
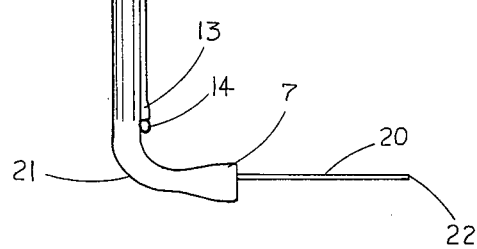
FIG. 4
FIG. 5

MANUAL RADIATOR RODDER

SUMMARY OF THE INVENTION

The present invention relates to a new and unique tool that effectively removes rust, corrosion, mineral deposits, deposited compounds and deposited elements from the internal coolant passageways of heat exchangers such as radiators of liquid cooled motors in such a manner that there is no requirement to remove said heat exchanger from the vehicle or device upon which it is mounted.

BACKGROUND OF THE INVENTION

Throughout the history of fluid cooled motors, such as automobile motors, severe problems in coolant passageway clogging have continuously occurred. Deposits of rust, mineral, corrosion and various other deposits have accumulated in the coolant passageways (radiator cores) of the various type engines blocking the flow of the motor's coolant and thus causing the motor to overheat and become inoperative. As a means of repair it has been common practice to remove clogged radiators from their respective vehicle and to boil them in various solutions to dissolve the deposits clogging the coolant passageways. This procedure is very expensive because of the many hours of labor required to remove the radiator from the vehicle, and in many cases is not very effective as frequently evidenced by the recurrence of motor overheating.

The present invention provides a positive and inexpensive means of thoroughly cleaning radiator cores without removing them from the vehicles or frames on which they are installed.

An important object of this invention is to provide a device with the capability to penetrate the internal passageways (cores) of heat exchangers such as coolant radiators while they are mounted, for example in their respective vehicles or operating frames.

Another object of this invention is to provide a device with the capability of scraping deposits from the internal walls of tubular passageways.

A further object of this invention is to provide a device with the capability of flushing loose deposits from the passageways of coolant radiators while they are mounted in their respective vehicles or operating frames.

Yet another object of this invention is to provide a device that will illuminate the interior of heat exchangers in such a manner that the operator of said tool may readily view tubular openings and adjacent interior surfaces.

A still further object of the present invention is to provide a tool that will readily snap onto tubular projections in such a manner that the inside diameter of said tool is aligned with the inside diameter of the tubular projection.

An additional object of the present invention is to provide a combination tool that is manually operated and which may easily be employed by a lay mechanic.

Another object of the present invention is to provide a tool which will allow the rapid and thorough cleaning of coolant radiator cores.

These and other objects are accomplished according to the present invention which consists of an "L" shaped, elongated tube fitted at its upper extremity with a female hose connector and whose lower extremity evolves into a rigid, contiguous, elipsoidal female fitting with a light attached. The L-shaped tube houses a reciprocating capable length of semiflexible ribbon which in cooperation with the aforementioned components form as an entity a device that dislodges and flushes deposits from the cores of coolant radiators.

Other objects and many of the attendant advantages of this invention will be readily appreciated as the same becomes better understood by reference to the following detailed description when considered in connection with the accompanying drawings wherein:

FIG. 4 is a reduced scale plan view of the current invention.

FIG. 5 is an isometric view of the lower extremity detail of the current invention.

Figure 1:
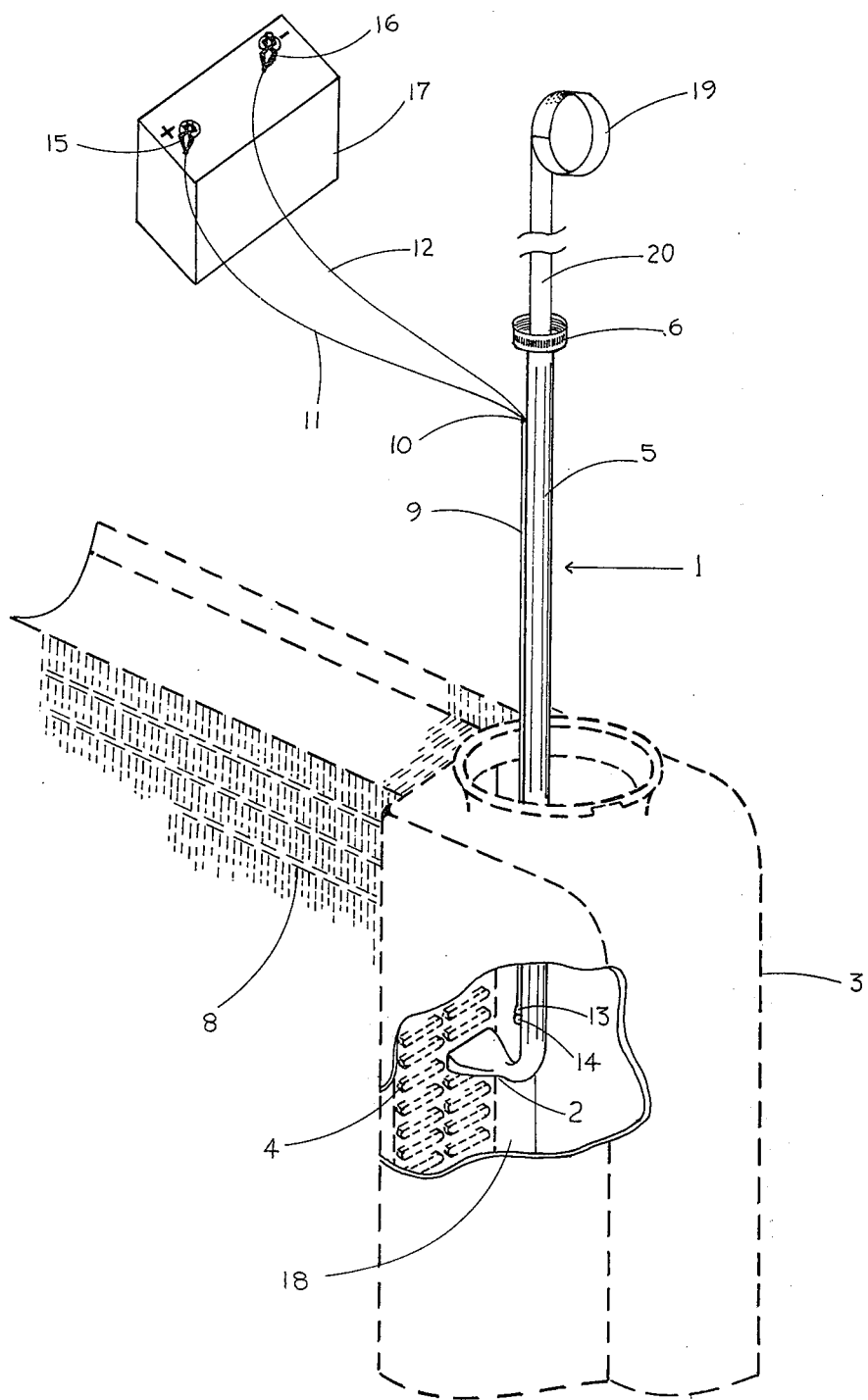
FIG. 1 is a perspective view showing a preferred embodiment of the current invention.
Figure 2:
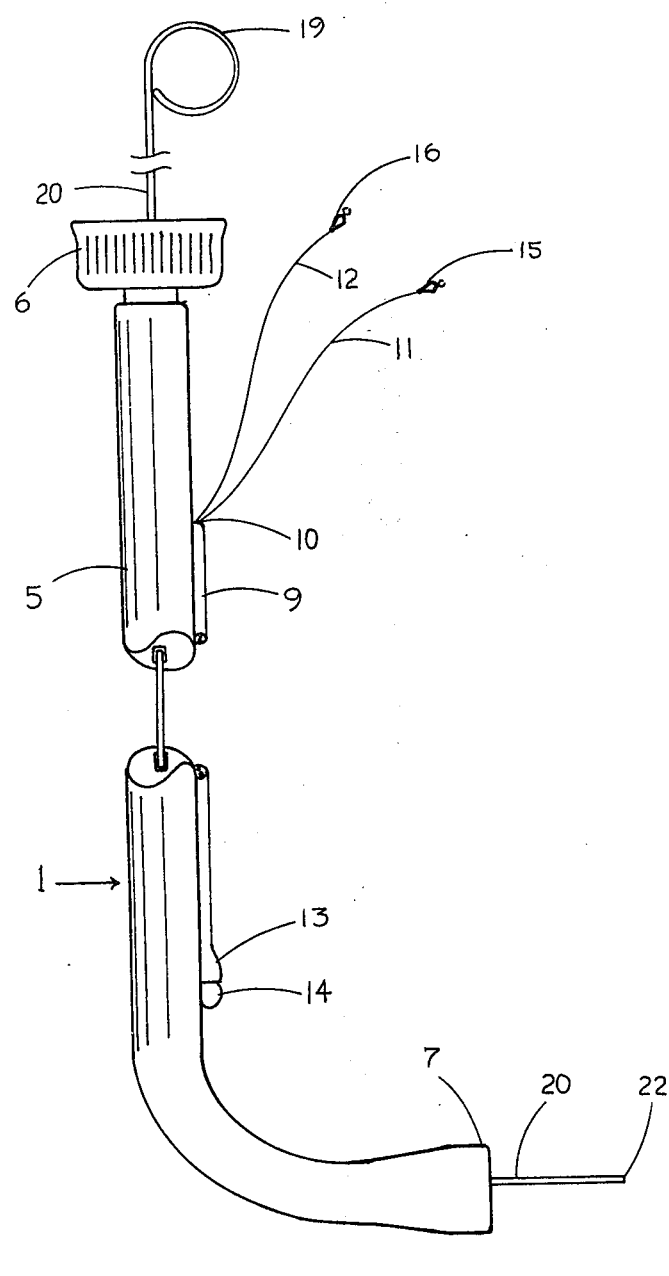
FIG. 2 is a side plan view of the current invention.
Figure 3:
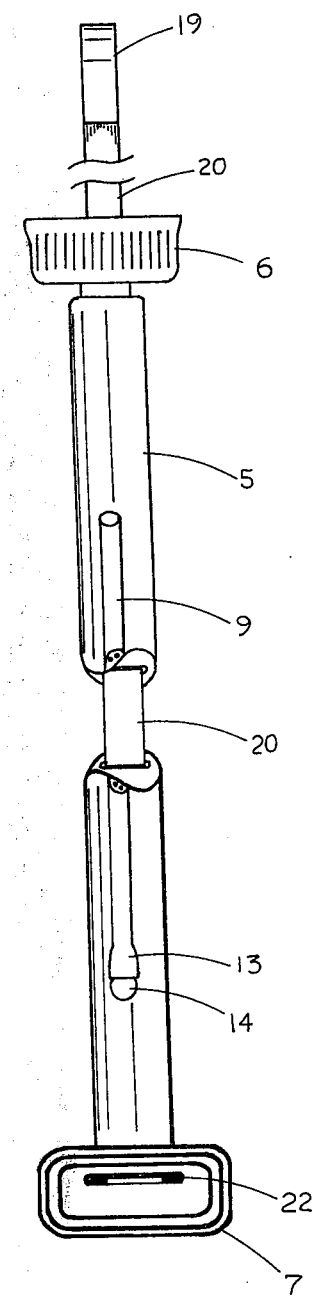
FIG. 3 is a front plan view of the current invention.

In the drawings wherein for the purpose of illustration is shown a preferred embodiment of the present invention and wherein similar reference characters designate corresponding parts throughout the several views, the complete device is designated 1.

FIG. 1 shows a preferred embodiment of the present invention 1 in position for use with its lower extremity 2 slipped over the open end of an automotive coolant radiator's 3 core tubule 4. The device comprises a main body tube 5 to which at its upper extremity there has been affixed a female garden hose connector 6 and whose lower extremity 2 has been formed into an elipsoidal female fitting 7 which is capable of receiving and mating with the open end tubules 4 of coolant radiator cores 8. Affixed to the main body tube 5, there is a tubular conduit 9 of smaller diameter that is open at its upper extremity 10 so that it receives electrical wires 11 and 12 and provides an enclosed passageway for said wires throughout the length of main body tube 5 to a point 13 where they are connected to a light bulb 14 in such a manner that when connector clips 15 and 16 are connected to an electrical source, such as a storage battery 17, the light bulb 14 will illuminate that interior area 18 of the radiator 3. The base tube 5 further provides a means for an operator to hold the rodder 1 in position with its elipsoidal female fitting 7 mated to the open end of the radiator's 3 core tubules 4 with one hand while he uses his other hand to grasp the grip ring 19 of the rodder shaft 20 in such a manner that he may readily force the flexable rodder shaft 20 downward into the base tube 5 and may readily withdraw the rodder shaft 20 upward from the base tube 5 to thus cause a vertical reciprocating motion to be imparted to the rodder shaft 20. Said rodder shaft 20, due to the aforementioned vertical reciprocating motion applied in various length strokes, passes through the base tube 5 whereupon its vertical reciprocating motion is converted by the base tube's L-shaped terminus 21 into a linear reciprocating motion and whereby the alignment characteristics of the female elipsoidal fitting 7 so align the lower terminus 22 of the rodder shaft 20 that the rodder shaft 20 passes into and out of the radiator's 3 tubules 4 and in the course of so doing, the rodder shaft 20 will dislodge accumulated deposits from the inner diameters of the tubules. Once the deposits have been dislodged, the rodder shaft 20 is completely withdrawn from the main body tube 5 and set aside. At this point, a garden hose connected to a suitable source of fluid, such as a water tap, is attached to the main body tube 5 by means of its female hose fitting 6 and firmly secured thereto. The female elipsoidal fitting 7 on the lower terminus of the main body tube 5 is then alternately refitted to the open end of the various radiator core tubules 4 and water under normal tap pressures is applied to the tubule's 4 inner diameter to flush previously dislodged deposits from the tubules 4.

Various changes may be made to the form of the invention herein shown and described without departing from the spirit of the invention or scope of the claims.

Having described this invention what I claim as new and pray issuance of Letters Patent for, is:

1. A device for cleaning the tubes of an automotive radiator comprising in combination: an elongated, hollow conduit, said conduit being provided at one end with coupling means for attaching a source of flushing fluid to said conduit and at the other end with means for coupling said conduit to the open end of an automotive radiator tube; flexible flat elongated means for reaming foreign material from said automotive radiator tubes by manual reciprocating motion, said flexible elongated means being disposed within said conduit and adapted for said reciprocating movement through said conduit and into a heat exchanger tube when said conduit is coupled therewith.

2. The device of claim 1 wherein said means for coupling said conduit to said heat exchanger tube comprises means disposed at right angles to said conduit for fitting over the open end of said automotive radiator tube.

3. The device of claim 1 wherein said means for attaching fluid supply means to said conduit is a coupling means for attaching a water hose.

4. The device of claim 1 which further includes electric illumination means disposed near the end of said conduit adapted to be coupled to said heat exchange tube.

5. The device of claim 1 wherein said elongated means for reaming the heat exchanger tubes is of sufficient length to pass through the length of said conduit into said heat exchanger tubes.

* * * * *